United States Patent [19]
Wenger

[11] Patent Number: 5,242,292
[45] Date of Patent: Sep. 7, 1993

[54] EXTRUDER APPARATUS FOR PRODUCING STERILE PELLETED FEED PRODUCT

[75] Inventor: Lavon G. Wenger, Sabetha, Kans.

[73] Assignee: Wenger Manufacturing, Inc., Sabetha, Kans.

[21] Appl. No.: 917,962

[22] Filed: Jul. 24, 1992

Related U.S. Application Data

[63] Continuation-in-part of Ser. No. 767,377, Sep. 30, 1991, abandoned.

[51] Int. Cl.[5] .............................................. B29B 9/10
[52] U.S. Cl. ................................... 425/308; 425/310; 425/311; 425/382.3; 425/DIG. 230
[58] Field of Search ............... 425/202, 308, 310, 311, 425/313, 382 R, 382.3, 464, DIG. 230; 264/142; 426/516

[56] References Cited

U.S. PATENT DOCUMENTS

| | | | |
|---|---|---|---|
| 2,319,859 | 5/1943 | Hale | 264/142 |
| 2,370,952 | 3/1945 | Gordon | 264/142 |
| 3,086,444 | 4/1963 | De Back | 99/483 |
| 3,304,578 | 2/1967 | Clute | 425/382 R |
| 3,389,204 | 6/1968 | Hafliger | 425/382 R |
| 3,511,190 | 5/1970 | Kunz | 425/310 |
| 4,221,340 | 9/1980 | dos Santos | 241/7 |
| 4,372,734 | 2/1983 | Dolan et al. | 425/131.1 |
| 4,381,184 | 4/1983 | Hurni et al. | 426/516 |
| 4,422,372 | 12/1983 | Hoezee | 99/353 |
| 4,630,533 | 12/1986 | Schaaf et al. | 99/353 |
| 4,744,995 | 5/1988 | Robinson | 426/454 |
| 4,767,301 | 8/1988 | Volk, Jr. | 425/DIG. 230 |
| 4,817,517 | 4/1989 | Ammann et al. | 99/483 |
| 5,009,586 | 4/1991 | Pallmann | 425/311 |
| 5,052,912 | 10/1991 | Masao | 425/310 |

FOREIGN PATENT DOCUMENTS

| | | | |
|---|---|---|---|
| 35902 | 3/1965 | German Democratic Rep. | 425/313 |
| 55-1166 | 1/1980 | Japan . | |
| 757607 | 9/1956 | United Kingdom . | |
| 820729 | 9/1959 | United Kingdom . | |

Primary Examiner—Jay H. Woo
Assistant Examiner—James P. Mackey
Attorney, Agent, or Firm—Hovey, Williams, Timmons & Collins

[57] ABSTRACT

An apparatus (10) and method for the production of sterile, pelleted feed products is provided which includes an extruder device (12) equipped with a pelleting head (14) adjacent the outlet end of the extruder barrel (17). The pelleting head (14) includes an annular die section (52) having die openings (58) therethrough which is secured to the extruder barrel (17), forming an extension thereof; a rotatable, multiple-vane plate (66) is secured to the screw (42) of the device (12) and cooperates with the die section (52) to form final pellets. A rotatable knife (16) serves to cut emerging extrudate so as to size the pellets. In an alternative embodiment, the plate (66) is separately powered for rotation independent of the extruder screw (17), preferably by means of a prime mover (102) coupled with a short extruder screw section (100) which supports the plate (66). Preferably, the extruder device (12) is equipped with an upstream preconditioner (40) serving to moisturize and uniformly mix dry feed ingredients. The preconditioner also at least partially precooks the mixture and subjects the same to time-temperature conditions for sterilization purposes.

12 Claims, 3 Drawing Sheets

EXTRUDER APPARATUS FOR PRODUCING STERILE PELLETED FEED PRODUCT

RELATED APPLICATIONS

This is a continuation-in-part of application Ser. No. 07/767,377 filed Sep. 30, 1991, now abandoned.

BACKGROUND OF THE INVENTION

1. Field of the Invention

The present invention is broadly concerned with a method and apparatus for the continuous production of sterile pelleted feed products, such as those used for the feeding of cattle, hogs, poultry and other livestock. More particularly, it is concerned with such a method and apparatus making use of an extruder device equipped with a unique pelleting head adjacent the outlet end of the extruder barrel and operable for receiving material directly from the extruder barrel and forming the same into sterile, self-sustaining pelleted bodies. The invention also comprehends the final pelleted bodies which have a novel combination of properties important in the context of livestock feeds.

2. Description of the Prior Art

Livestock feeds have long been produced through use of conventional pellet mills. In such methods, the starting feed ingredients, together with optional binders, are fed to the inlet of the pellet mill and are formed into self-sustaining bodies. A common problem associated with such feeds is that they lack requisite sterility. This factor is of increasing concern in a wide variety of feeds, but especially in poultry feeds where salmonella is a significant problem. Furthermore, prior pelleted feeds are characterized by no more than about 40% gelatinization the starch fractions thereof, and with less than 70% of the protein contents being denatured, which present problems of digestibility.

It has also been known in the past to process feed materials using a extrusion cooker. This technique produces a fully cooked feed product, but typically results in an expanded cellular structure in the feeds and consequent low bulk densities and specific gravities.

Finally, it has also been proposed to initially process feed ingredients using an extrusion cooker, o followed by grinding of the extrudate and subsequent passage thereof through a separate, conventional pellet mill. This is of course a relatively expensive proposition, requiring both an extruder and a pellet mill, as well as intervening processing equipment. As such, the economics of such a system are unfavorable.

SUMMARY OF THE INVENTION

The present invention overcomes the problems outlined above and provides a method and apparatus for the continuous production of sterile feed products. The apparatus of the invention includes an extruder device in the form of an elongated, tubular barrel presenting an inlet end and an outlet end, with an elongated, axially rotatable, flighted screw situated within the barrel for transporting feed materials from the inlet to the outlet end. A preconditioner for forming a starting mixture and optionally partially precooking the same may be provided upstream of the extruder inlet.

The extruder device is moreover equipped with pelleting means including an annular die member adjacent to and in communication with the outlet end of the extruder barrel and forming an extension thereof. The annular die member has a plurality of die openings therethrough oriented with their axes transverse to the longitudinal axis of the barrel. A pellet-forming plate also forms a part of the pelleting means and is situated within the die member and cooperable therewith for forming pellets from the material passing from the extruder barrel outlet end. The plate means may be coupled to the primary extruder screw, advantageously by means of a screw securing the plate to the outboard, butt end of the extruder screw. In this fashion, the pellet-forming plate rotates with the extrusion screw and cooperates with the surrounding peripheral die structure to form self-sustaining extrudate from the material passing directly from the extruder barrel. Alternately, the pelleting plate may be secured to a prime mover separate from the extruder screw, so that rotation of the pelleting plate is independent of extruder screw rotation. A conventional, rotatable cutting head is also provided adjacent the pelleting head, and serves to cut the emerging extrudate into convenient lengths.

In preferred forms of the invention, the pellet-forming plate has a central portion with a plurality of radially outwardly extending, circumferentially spaced vanes, each of the latter including an outboard arcuate edge portion complemental with the adjacent inner surface of the peripheral die member. This plate member is retained between the outboard end of the extruder barrel and an imperforate plate member secured to the die and closing the end thereof remote from the extruder barrel. In the embodiment of the invention making use of a pelleting plate powered separately from the extruder screw, the plate is coupled with a short helical screw oriented in opposition and alignment with the main extruder screw, with the short helical screw being powered by a separate prime mover.

In practice, a substantially uniform, pelletizable mixture including starch-bearing and proteinaceous feed components and water is subjected to time-temperature conditions sufficient to substantially completely sterilize the material, involving optional preconditioning and passage of the material into and through the extruder. Thereafter, the feed mixture is directly passed into the annular die member, whereupon the rotating, multiple-vaned plate serves to force the material outwardly through the peripheral die openings.

DESCRIPTION OF THE DRAWINGS

FIG. 1 is fragmentary prospective view illustrating the preferred apparatus in accordance with the invention;

FIG. 2 is an enlarged fragmentary view in partial vertical section and with certain parts illustrated in phantom, depicting in detail the pelleting head and knife structure of the overall apparatus;

DESCRIPTION OF THE PREFERRED EMBODIMENT

Figure 5:
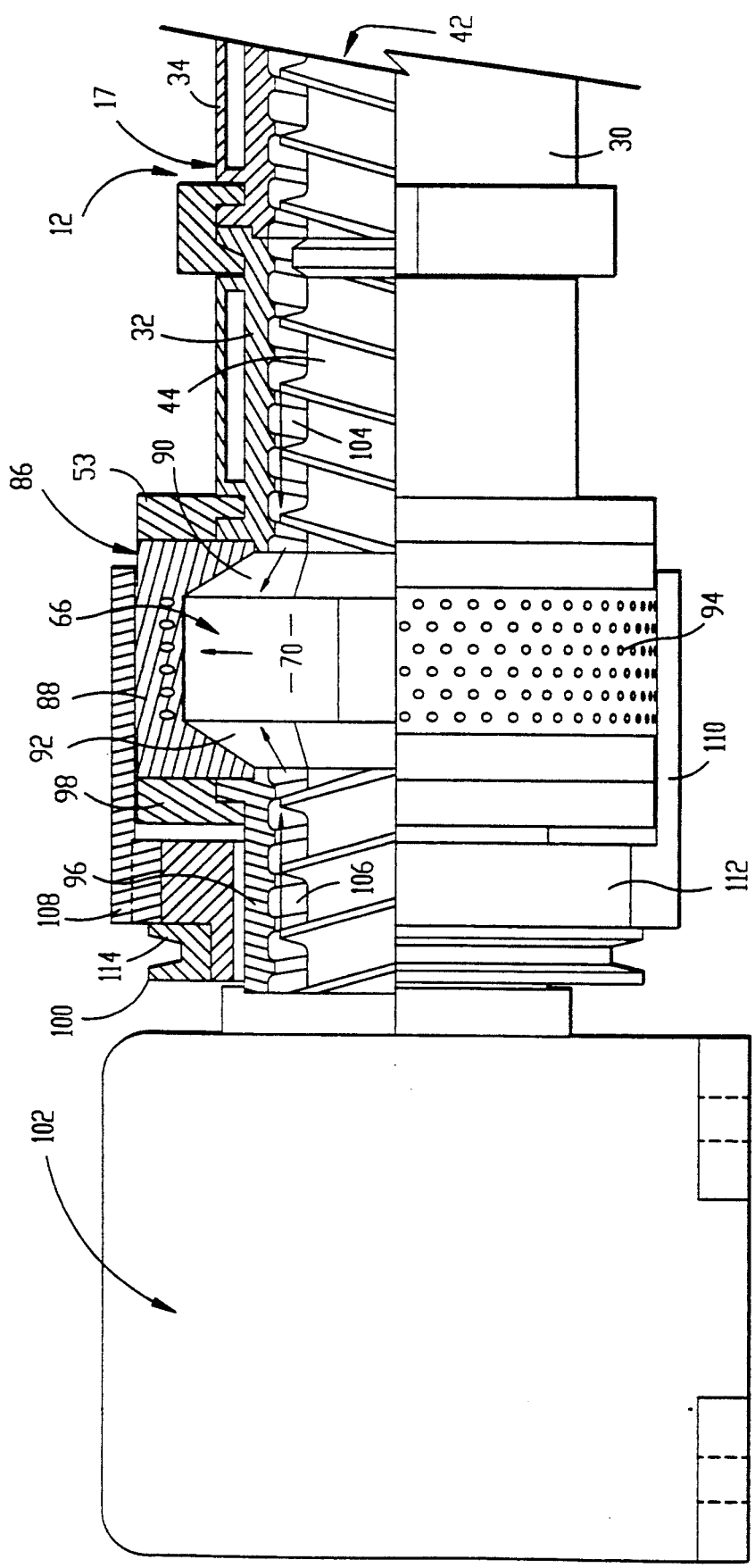
FIG. 5 is a side view, partially in elevation and partially in vertical section, depicting another embodiment of the invention making use of a pelleting plate powered separately from the primary extruder screw.

Turning now to the drawing, and particularly FIG. 1, apparatus 10 in accordance with the invention is illustrated. Broadly speaking, the apparatus 10 includes an extruder device 12, pelleting head 14, and a knife assembly 16.

The extruder device 12 as illustrated is an 7-head X-130 extruder commercialized by Wenger Manufacturing, Inc. of Sabetha, Kansas. The X-130 machine includes an elongated, tubular barrel broadly referred to by the numeral 17. The latter has an inlet head 18 presenting a material inlet 20, together with a series of six axially aligned and interconnected heads 22-32. Each head is equipped with an external jacket, such as jacket 34 depicted in FIG. 2, permitting introduction and circulation of heating or cooling media (e.g. cold water or steam) to thereby assist in controlling the temperature conditions within the extruder barrel 17. Respective conduits 36, 38 are operatively coupled with each jacket for circulation of the heating or cooling media.

A product inlet chute is normally attached to material inlet 20. In addition, a conventional preconditioner 40 is attached to the upper end of the chute and serves to moisten, premix and optionally precook the feed materials directed to extruder device 12. An exemplary preconditioner would be one in accordance with U.S. Pat. No. 4,752,139, although other devices of this general character can be used. In the preconditioner, the dry feed ingredients may be mixed with water and/or steam in order to achieve a premixed and (optionally) partially precooked mixture to be fed to the extruder inlet.

The overall extruder device 12 further includes an elongated, axially rotatable, multiple-section screw 42 within barrel 17. The endmost section 44 of screw 42 is illustrated in FIG. 2, and those skilled in the art will appreciate that the screw extends the full length of barrel 17. Moreover, the screw may be configured in various ways using sections of different pitch and/or flighting; also, intermediate devices such as mixing elements or shearlocks can be used between screw sections. These variations are dictated by desired processing conditions and designer choice. The overall screw 42 is driven by means of motor 46, with proper interconnection and bearing structure (not shown) serving to couple the motor 46 and the screw 42.

Figure 4:
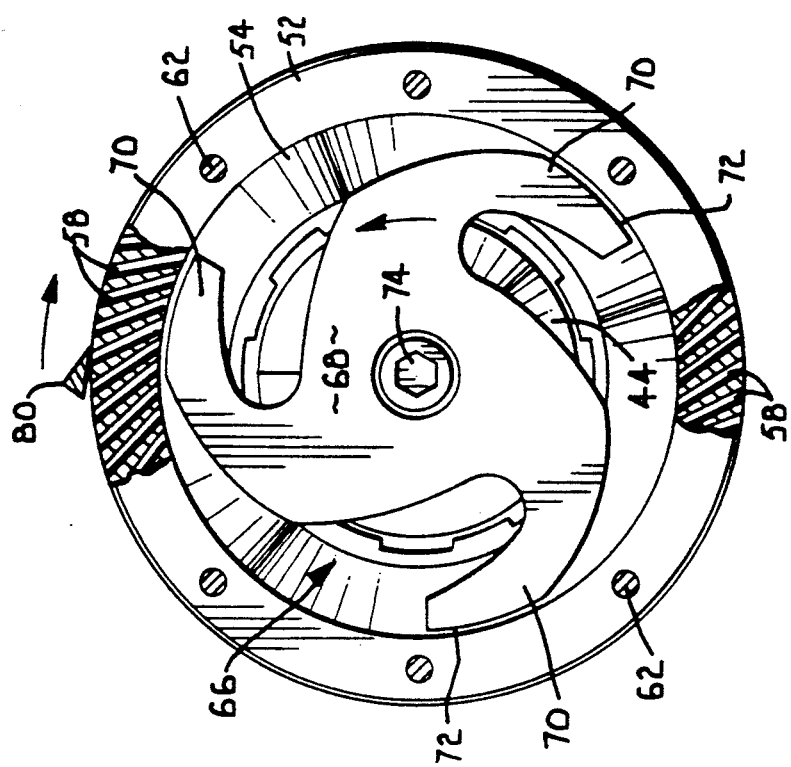
FIG. 4 is a vertical sectional view, with certain portions broken away, taken along line 4—4 of FIG. 2.
Figure 3:
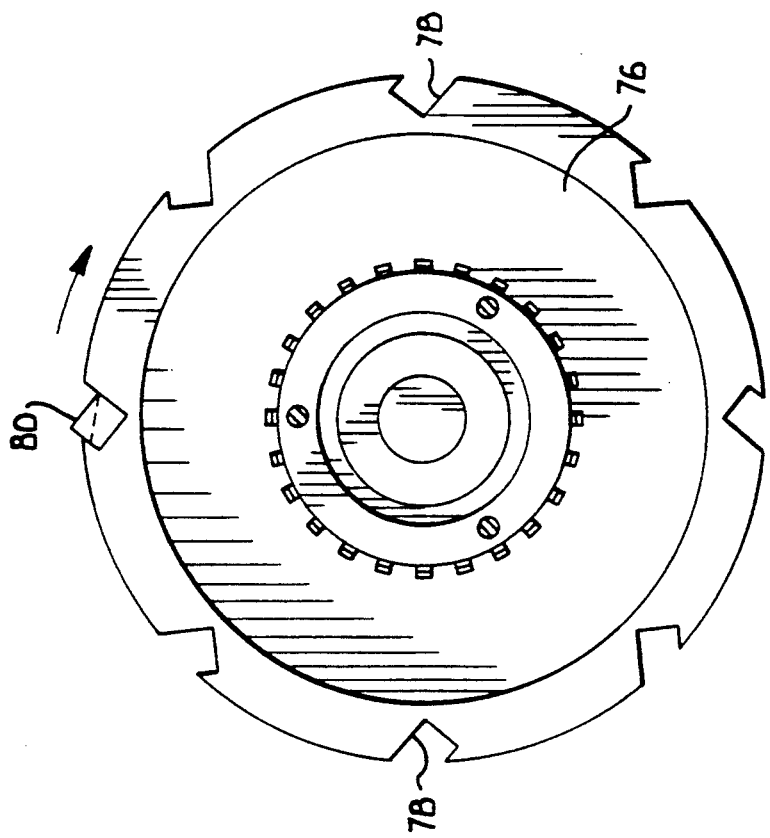
FIG. 3 is a vertical sectional view taken along the line of 3—3 of FIG. 2.
Figure 5:
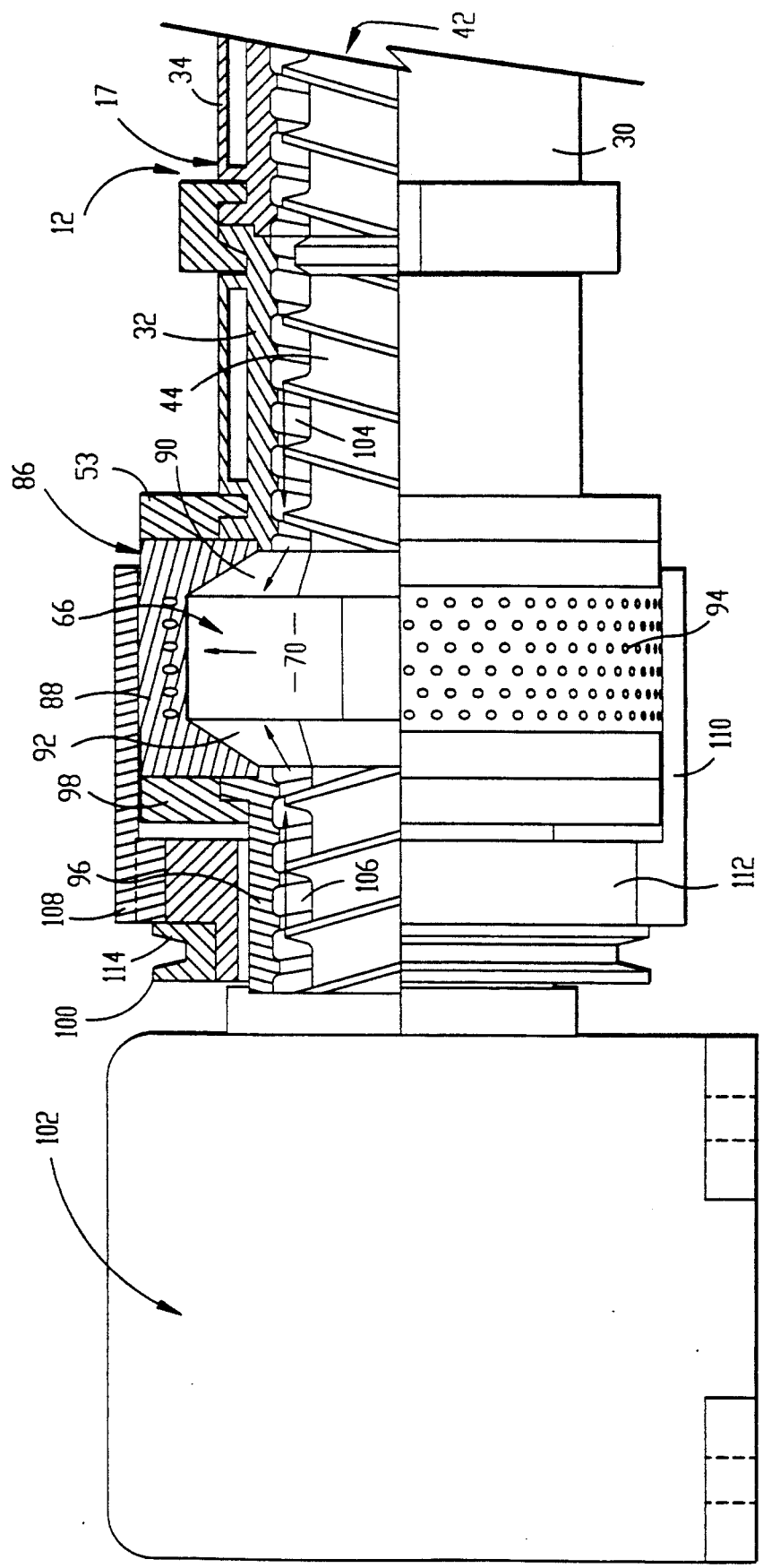

Turning now to FIGS. 2-4, the pelleting head 14 will be described. This head includes an annular die member 48 presenting a circular, tapped attachment ring 50 as well as an integral, forwardly extending die section 52. The die member 52 is affixed to head section 32 by means of a complemental annular attachment ring 53 and screws 53a; the ring 53 engages an integral, peripheral lip forming a part of the head section 32. As best seen in FIG. 2, the ring 50 presents a frustoconical inner wall 54 defining a central passageway 56, the latter being in communication with the outboard end of barrel head 32. The die section 52 includes a plurality of die openings 58 therethrough, having their axes transverse to the longitudinal axis of the barrel 17. It will further be observed that the axes of the openings 58 lie along respective chords of the circular die section 52.

The outboard end of die section 52 is covered by means of an imperforate plate 60, which is attached by means of screws 62. The plate 60 has a central, forwardly extending stub shaft 64 which is used to orient the cutting knife assembly 16 as will be explained.

The pelleting head 14 also includes an internal pellet-forming plate 66 which is situated between the ring 50 and covering plate 60. The plate 66 includes an apertured, recessed central portion 68, together with a plurality (here 3) of radially outwardly extending, circumferentially spaced vanes 70. Each of the vanes 70 includes an outermost, arcuate edge 72 proximal to the inner defining wall surface of the die section 52 and cooperable with the latter for forcing material through the die openings 58. In the embodiment of FIGS. 1-4, the plate 66 is secured to screw section 44 by means of screw 74 situated within the central recess of the plate and passing into the butt end of the screw section.

Knife assembly 16 is essentially conventional, and includes a circular head member 76 provided with a plurality of knife-receiving openings 78 in the periphery thereof. The inner face of the head 76 is recessed to receive stub shaft 64, to thereby orient the head for cutting purposes. One or more elongated cutting knives 80 are located within the corresponding openings 78, and extend rearwardly and in close proximity to the outer surface of die section 52 (see FIG. 2). The head 76 is rotated by means of a drive shaft 82 operatively coupled via universal joint 84 to the head; the shaft 82 is in turn operatively coupled with a knife drive motor (not shown). Rotation of the head 76 causes corresponding rotation of the knife 80, thereby serving to cut the extrudate emerging from die openings 58 into convenient lengths.

Attention is next directed to FIG. 5 which depicts an alternative embodiment. In this case, the extruder 12 is employed, but the pellet-forming plate is not directly coupled to extruder screw 42, but rather is separately powered. In particular, it will be seen that this embodiment includes a pelleting head 86 in the form of an annular die member 88 presenting a pair of opposed, circular end openings 90, 92. The die member 88 includes a series of die openings 94 therethrough, each having its axis transverse to the longitudinal axis of extruder barrel 17. The end of die member 88 adjacent opening 90 is affixed to the butt end of extruder barrel 17 by means of attachment ring 53 previously described. An internal pellet-forming plate 66 identical with that described previously is situated within the die member 88 and includes the radially outwardly extending, circumferentially spaced vanes 70.

As indicated, in the FIG. 5 embodiment, the plate 66 is not affixed to the end of screw 42, but is separately powered. To this end, a short tubular barrel section 96 is affixed to the open end of section 96 by means of attachment ring 98. A short extruder screw section 100 is situated within the confines of barrel section 96, and conventional bolt means (not shown) are employed for attaching the pellet-forming plate 66 to the end of screw section adjacent opening 92, in the same manner as the attachment between plate 66 and screw 42 described with reference to FIGS. 1-4.

A prime mover broadly referred to by the numeral 102, including a conventional electric drive motor and bearing assembly, is operatively coupled with the end of screw section 100 remote from plate 66. It will be observed that the flighting on screw 100 is reversed as compared with that on primary extruder screw 42. This factor, together with appropriate rotation of the screw section 100 via prime mover 102, serves to operate, in conjunction with screw 42, for feeding the pellet-forming chamber between these screw sections where the plate 66 rotates. In particular, the net flow of material within primary extruder barrel 17 is in the direction of arrows 104, whereas the net flow of material within the short barrel section 96 is in the direction of arrows 106, or again into the pellet-forming chamber. Thus, any material passing through barrel 17 which does not pass through the openings 94 will pass into the short barrel section 96, and thence be forced back into the pelleting chamber for pellet formation.

Cut-off of the material emerging from the openings 94 is accomplished by means of a pair of rotatable cut-off blades 108, 110 respectively secured to an annular, rotatable ring 112 disposed about short barrel section 96. A drive pulley 114 is secured to the ring 112, and is connected via a conventional belt (not shown) to a cut-off motor (likewise not shown).

Preferred processing conditions using apparatus 10 involved initially preconditioning dry feed ingredients to uniformly moisturize and precook materials and form an at least partially sterilized mixture for passage into extruder 12. In this connection, preconditioning of this type normally involves injection of water and/or steam with intense mixing. Advantageously, the moisture level of the initially dry ingredients ranges from about 10%–14% by weight, and, after preconditioning, this moisture level is typically elevated to a level of from about 16%–30% by weight, and more preferably from about 16–20% by weight, MCWB (moisture content, wet basis). Where higher moisture levels above about 20% are used, less moisture need be added directly to the material as it passes through the extruder barrel. Conversely, where lower moisture levels on the order of 16–20% by weight are employed, it is often advantageous to add moisture directly to the material as it passes through the extruder barrel.

In terms of temperature, it is preferred to elevate the temperature of the mixture in the preconditioner to a level of from about 160°–210° F., and more preferably from about 190°–205° F. The residence time of the mixture within the preconditioner will depend upon the equipment selected and the degree of mixing desired; generally speaking, however, the average residence time of the material in the preconditioner should be from about ½–8 minutes, and more preferably from about 4–7 minutes.

After preconditioning, the mixture is fed into the barrel of extruder 12. In the extruder, the screw 42 serves to convey the material toward the outlet end of the barrel. In many cases, the material is subjected to extruder conditions wherein the temperature of the material remains at or slightly below the maximum temperature achieved in the preconditioner; to this end, the jackets of the extruder heads may be supplied with cooling water. Such temperature maintenance is often desired to prevent undue temperature increases in the material during passage thereof through the extruder, which can lead to expansion of the product as it emerges from the pelleting head. In any event, the maximum temperature of the material within the barrel should be from about 210°–250° F., and more preferably from about 225°–250° F.

During passage through the extruder, the mixture will also be subjected to increasing amounts of shear and pressure. The maximum pressure conditions achieved in the extruder barrel should be from about 75–250 psi, and more preferably from about 125–215 psi. The screw rpm should be from about 100–200 rpm. Also during such passage, moisture may be added directly to the material passing through the barrel, in the form of injected water and/or steam.

The material exiting the extruder barrel passes directly into pelleting head 14, whereupon the material is forced outwardly through the die openings 58 because of the action of rotating plate 66. The moisture level of the pellets as they emerge from the die openings should be from about 18–30% by weight, and more preferably from about 22–26% by weight. These pellets should also have a bulk density of from about 28–35 lbs./cu.ft., and a specific gravity greater than about 1, and preferably from about 1.1–1.2. The size of the pellets is variable, but typically the final pellets would have a length of from about ½ to 1¼ inches, and a diameter from about ⅛–⅜ inches. In order to have enhanced digestibility, the protein content of the final pellets should be at least about 80% denatured, whereas the starch fraction thereof should be at least about 50% gelatinized.

The products obtained from the extrusion apparatus would typically be dried in commercial practice, for example to a total moisture content of from about 8%–14% by weight, and more preferably from about 10%–12% by weight.

Although a wide variety of dry feed starting ingredients may be used in the context of the invention, it is preferred that the mixtures contain both starch-bearing and proteinaceous components. The former would include corn and other farinaceous ingredients, whereas the latter would typically include vegetable protein sources such as soybeans. In order to achieve the best pelleted product, the starting mixture should contain at least about 10% by weight starch and from about 1%–99% by weight protein.

EXAMPLE

A series of runs were conducted using apparatus of the type described above in connection with FIGS. 1-4 to produce sterile pelleted feed products, namely cattle feed. In each run the dry ingredients included 60% by weight corn, 5% by weight meat and bone meal, 11% by weight whole soybeans, 8% by weight soy hulls, 5% by weight distillers dried grain (Midsol), 10% by weight whole oats, and 1% by weight sodium bicarbonate. These dry ingredients were passed through a hammermill equipped with a 1/16" screen for sizing purposes.

The dry ingredients were then fed to a Model 54 DDC mixing cylinder manufactured by Wenger Manufacturing, Inc. in accordance with U.S. Pat. No. 4,752,139, along with moisture in the form of water and steam. In the preconditioner, the materials were thoroughly mixed and the starch fraction of the formula was gelatinized to a level of at least about 50% cook. In particular, the conditions in the DDC device were as follows:

Input moisture of dry feed ingredients: 11.0% by wt., MCWB
Feed rate through preconditioner: 2500 lbs./hr.
Feed rate of steam to preconditioner: 250 lbs./hr.
Feed rate of water to preconditioner: 120 lbs./hr.
Maximum (discharge) temperature of mixture in preconditioner: 195° F.
Residence time of mixture in preconditioner: 5.5 minutes
Moisture of discharged material: 18% by wt., MCWB Following this initial treatment, the respective mixtures were fed into a Wenger X-130 extruder system having the pelleting head of the invention mounted adjacent the normal die end of the extruder. In particular, the X-130 system included a Model 7C Wenger preconditioner (which was used primarily as a conveying device only), as well as an X-130 extruder consisting of a total of 7 heads. The inlet head was a Wenger Part No. 28905-017; heads 2-7 were Wenger Parts Nos. 28906-011, 28906-013, 28372-011, 28318-011, 28318-009 and 28318-009. The rotating elements making up the internal extruder screw were made up of the following interconnected Wenger parts: 28638-000, 28326-009B, 28364-000, 28580-001F, 28580-001F, 28580-001F, 28364-000, 28326-009B, 28326-009B, 28326-009B, and 28326-009B. The pelleting head depicted and described with reference to FIGS. 1-4 was attached to the butt end of the 7th head of the X-130 extruder barrel, and formed an extension thereof. The multiple-vane pelleting spider plate was affixed to the adjacent end of the extruder screw, as described above. A conventional cutting knife was also provided to give finished pellets of appropriate length.

During processing, the feed materials were fully sterilized and pelletized, yielding self-sustaining, relatively high moisture pellets. The pellets were then dried in the usual manner.

The conditions in the X-130 preconditioner and extruder, as well as drying conditions, are set forth below. It should be understood that the listed extruder temperatures are those recorded using barrel-mounted indicator thermocouples, and, because cold water is circulated to all heads, these recorded temperatures are lower than the actual product temperatures; the actual maximum product temperatures are estimated to be considerably higher as indicated, and certainly above 212° F. in the barrel because of the observation of steam evaluation at the die. In the following Tables, ppm refers to pounds per minute, whereas CW refers to cold water through the jacketed extruder barrel heads for indirect cooling purposes. Water flow to extruder refers to water injected into the extruder barrel for mixing with the material passing therethrough.

TABLE

| X-130 Preconditioning Information | | | | | | |
|---|---|---|---|---|---|---|
| | | RUN #1 | RUN #2 | RUN #3 | RUN #4 | RUN #5 |
| Mixing Cylinder speed | RPM | 550 | 550 | 550 | 550 | 550 |
| Water Flow to Mixing Cylinder | PPM | 3.000 | 0.000 | 0.000 | 0.000 | 0.000 |
| Mixing Cylinder Temperature | °C. | 190.00 | 150.00 | 160.00 | 160.00 | 150.00 |
| EXTRUSION INFORMATION | | | | | | |
| Extruded Shaft Speed | RPM | 220 | 200 | 250 | 300 | 320 |
| Extruder Amperage | | 64 | 62 | 74 | 80 | 88 |
| Water Flow to Extruder | PPM | 0.470 | 0.247 | 0.470 | 0.710 | 0.000 |
| Control/Temperature 2nd Head | CW °F. | CW | CW | CW | CW | CW |
| Control/Temperature 3rd Head | °F. | CW | CW | CW | CW | CW |
| Control/Temperature 4th Head | °F. | CW | CW | CW | CW | CW |
| Control/Temperature 5th Head | °F. | CW/60 | CW | CW | CW | CW |
| Control/Temperature 6th Head | °F. | CW/68 | CW | CW | CW | CW |
| Control/Temperature 7th Head | °F. | CW/98 | CW/97 | CW/93 | CW/93 | CW/91 |
| FINAL PRODUCT INFORMATION | | | | | | |
| Extrudate Moisture | MCWB | 34.18 | 26.10 | 30.32 | — | — |
| Extrudate Rate (Wet) | PPH | — | — | 2500.00 | 3120.00 | 4200.00 |
| Extrudate Density (Wet) | lbs/ft.$^3$ | — | 33.00 | — | 32.00 | 30.00 |
| DRYER CONDITIONS | | | | | | |
| Model of Dryer/Cooler | | | 600 | 1200 | 1200 | — | — |
| Temperature Setting (Zone #1) | | 235 | 235 | 235 | — | — |
| Retention Time - 1st Pass | Min. | 10.0 | 10.0 | 10.0 | — | — |
| Retention Time - 2nd Pass | Min. | 4.5 | 18.0 | 18.0 | — | — |
| Retention Time - Cooler | Min. | 2.3 | 9.0 | 9.0 | — | — |
| Bed Depth - 1st Pass | In. | 0.75 | 0.75 | 0.75 | — | — |
| Bed Depth - 2nd Pass | In. | 0.75 | 0.75 | 0.75 | — | — |
| Fan #1 Speed | | 1200 | 1200 | 1200 | — | — |
| Fan #2 Speed | | 1200 | 1200 | 1200 | — | — |

The extruder performance in Runs 1-3 was fair, and in Runs 4-5 the performance was good. Dense pellets were obtained in all runs. In the 5th Run, the extruder rate was increased and a small amount of steam was injected into the barrel. This made the pellets smoother and extruder flow more even.

These results demonstrate that the apparatus of the invention can continuously produce commercial quality feed pellets on a continuous basis. Use of the extruder device in conjunction with the pelleting head allows handling of feed mixtures having higher moisture contents than are usable with conventional pellet mills.

I claim:

1. Apparatus for the continuous production of a pelletized feed product, said apparatus comprising:

an extruder device including an elongated, tubular barrel presenting an inlet end and an outlet end defining a cross-sectional open area, and an elongated, axially rotatably, flighted screw situated within said barrel for transporting material from said inlet to said outlet end, said barrel and screw being configured for subjecting feed product to increasing shear and pressure along the length of said barrel; and pelleting means operatively coupled with said extruder device and including an annular die member secured adjacent to and in communication with the outlet end of said barrel and forming an extension thereof, said annular die member having an outboard wall section presenting an inner surface having an axial length and a diameter, said diameter throughout said axial length being greater than the diameter of said outlet end and substantially smaller than the length of said extruder barrel between the inlet and outlet ends thereof, and wall means extending from said outlet end to said outboard wall section to define an enlarged diameter expansion zone downstream of said outlet end, there being structure defining a plurality of die openings through the outboard wall section of said die member having axes transverse to the longitudinal axis of said barrel and passing through said inner surface, said inner wall surface defining a larger cross-sectional open area transverse to the longitudinal axis of said barrel throughout the axial length of the inner wall surface, as compared with the cross-sectional open area defined by said outlet end, pellet-forming plate means situated within said die member and cooperable with said die member for forming pellets from said material passing from said extruder barrel outlet end and into said expansion zone, said plate means having a maximum diameter greater than the diameter of said outlet end of said barrel and substantially less than the length of said extruder barrel, and means operatively coupled with said plate means for rotation of the plate means within said die member.

2. The apparatus as set forth in claim 1, said plate-rotating means comprising a prime mover separate from said flighted screw for rotation of said plate means independently of rotation of said flighted screw.

3. The apparatus as set forth in claim 2, said prime mover comprising a relatively short barrel section oriented in opposed relationship to said extruder barrel, a short extruder screw section situated within said short barrel section and operatively coupled with said plate means, said short extruder screw section being opposite in pitch to the pitch of said flighted extruder screw.

4. The apparatus of claim 1, said plate means having an axial thickness substantially smaller than the diameter thereof.

5. The apparatus as set forth in claim 1, said plate-rotating means comprising means for coupling said plate means to said screw for rotating of the plate means in response to rotation of the screw.

6. The apparatus as set forth in claim 1, said plate means comprising a central portion and a plurality of radially outwardly extending, circumferentially spaced vanes, each of said vanes including an outboard arcuate portion complemental with the adjacent inner surface of said outboard wall section.

7. The apparatus as set forth in claim 5, said coupling means comprising bolt means passing through said plate means and securing the latter to the end of said screw proximal to aid barrel outlet end.

8. The apparatus as set forth in claim 1, including knife means for successively cutting finished pellets, said knife means including a blade positioned exteriorly of said die member and closely adjacent said die openings, and means operatively coupled with said blade for rotation thereof.

9. The apparatus as set forth in claim 1, said pelleting means including an imperforate plate secured to said die member and closing the end thereof remote from said barrel outlet end, said plate means being situated between said barrel outlet end and said imperforate plate.

10. The apparatus as set forth in claim 1, including means for varying the temperature conditions within said barrel at respective locations along the length of the barrel.

11. Apparatus for the continuous production of a pelletized feed product, said apparatus comprising:
an extruder device including an elongated, tubular barrel presenting an inlet end and an outlet end, and an elongated, axially rotatably, flighted screw situated within said barrel for transporting material from said inlet to said outlet end; and
pelletizing means operatively coupled with said extruder device and including an annular die member secured adjacent to and in communication with the outlet end of said barrel and forming an extension thereof, said annular die member having a diameter greater than the diameter of said outlet end of said tubular barrel for passage of said material from the outlet end of said barrel into an enlarged diameter zone, there being structure defining a plurality of die openings through the die member having axes transverse to the longitudinal axis of said barrel, pellet-forming plate means situated within said die member and cooperable with said die member for forming pellets from said material passing from said extruder barrel outlet end, said plate means having a maximum diameter greater than the diameter of said outlet end of said barrel, and means operatively coupled with said plate means for rotation of the plate means within said die member, said plate-rotating means comprising a prime mover separate from said flighted screw for rotation of said plate means independently of rotation of said flighted screw, said prime mover comprising a short barrel section oriented in opposed relationship to said extruder barrel, a short extruder screw section situated within said short barrel section and operatively coupled with said plate means, said short extruder screw section being opposite in pitch to the pitch of said flighted extruder screw.

12. A pelleting head having means for securement thereof to the outlet end of an elongated extruder barrel having a rotatable flighted extruder screw therein, said pelleting head comprising:
an annular die member presenting a pair of opposed, apertured ends, and a diameter greater than the diameter of said barrel outlet end, and a circular wall extending between said apertured ends, there being structure defining a plurality of die openings through said circular wall;
pellet-forming plate means situated between said apertured ends and presenting a central section and a plurality of radially outwardly extending, circumferntially spaced vanes, each of said vanes including an outboard arcuate edge complemental with said circular wall, said plate means having a maximum diameter greater than the diameter of said barrel outlet end;
means for coupling said die member to the open outlet end of said extruder barrel whereby one of said die member end apertures is in communication with the interior of the extruder barre; and
means operably coupled with said plate member for rotation thereof within said die member, said plate-rotating means comprising a prime mover separate from said extruder screw for rotation of said plate means independently of rotation of said extruder screw, said prime mover comprising a short barrel section oriented in opposed relationship to said extruder barrel, a short extruder screw section situated within said short barrel section and operatively coupled with said plate means, said short extruder screw section being opposite in pitch to the pitch of said extruder screw.

* * * * *